Oct. 10, 1950   R. C. STOUFFER ET AL   2,525,626
RIVET-STEM GRIPPING AND PULLING MECHANISM
Filed Dec. 29, 1945   3 Sheets-Sheet 3
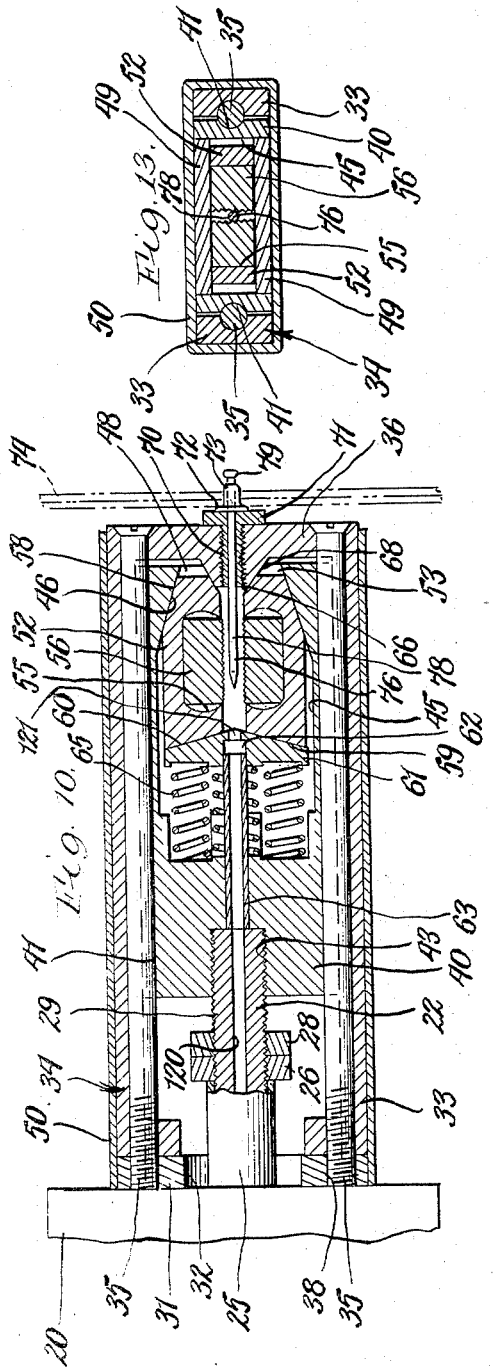
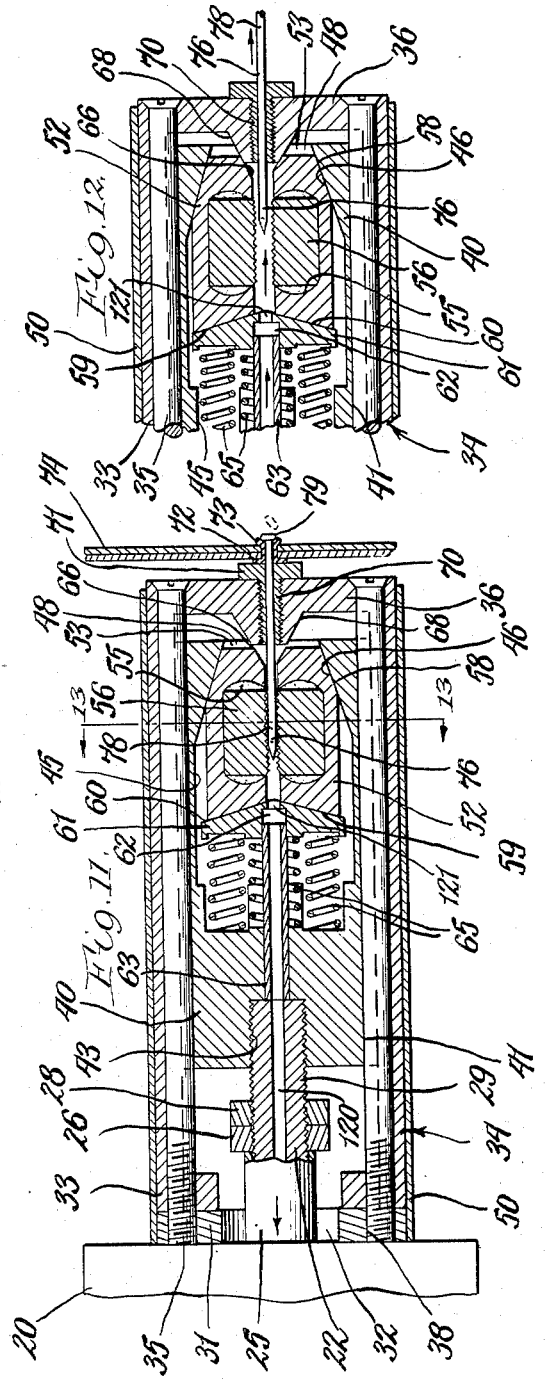
Inventors
Ray C. Stouffer and
Herbert W. Stouffer
by Popp and Popp
Attorneys Patented Oct. 10, 1950

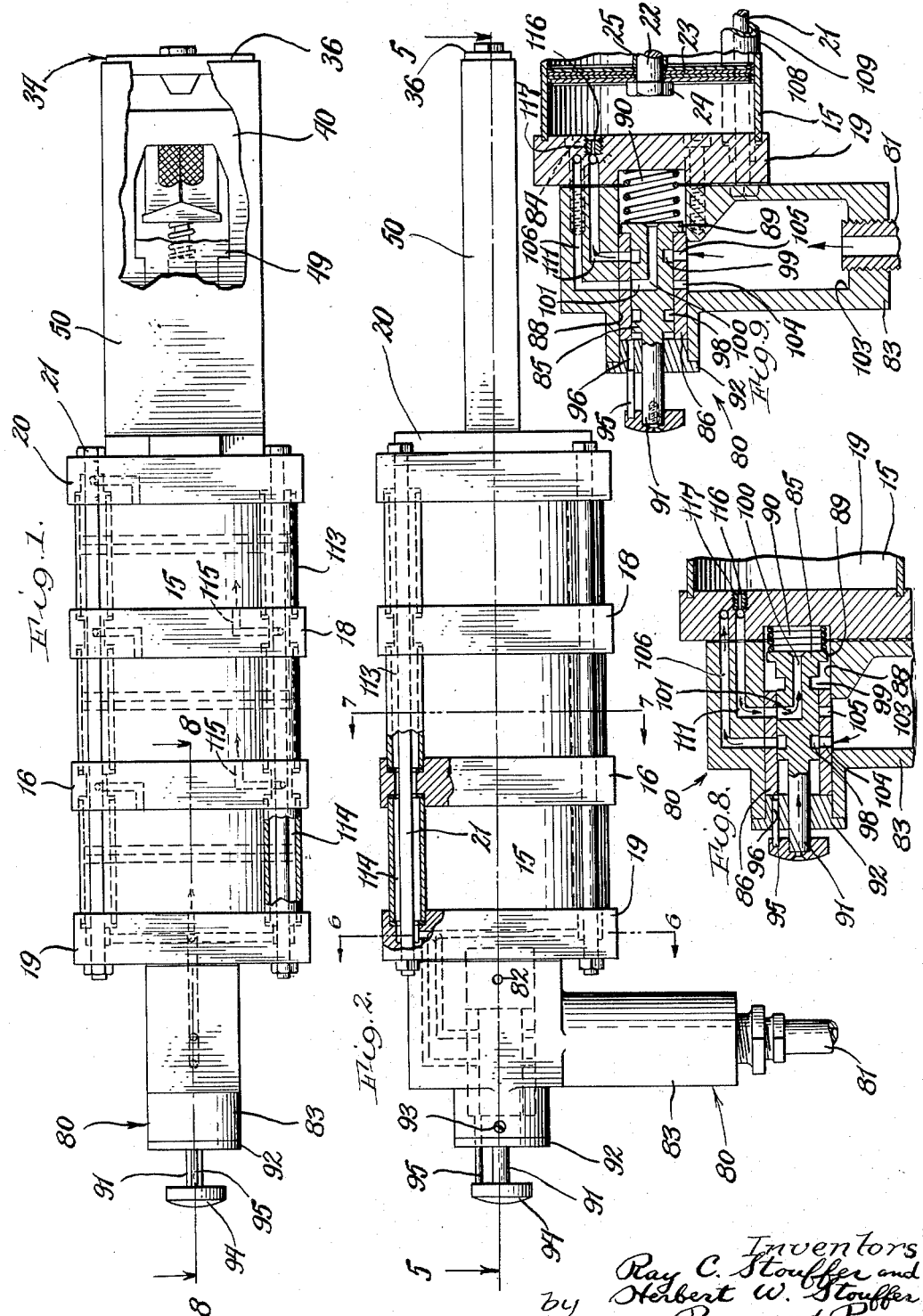

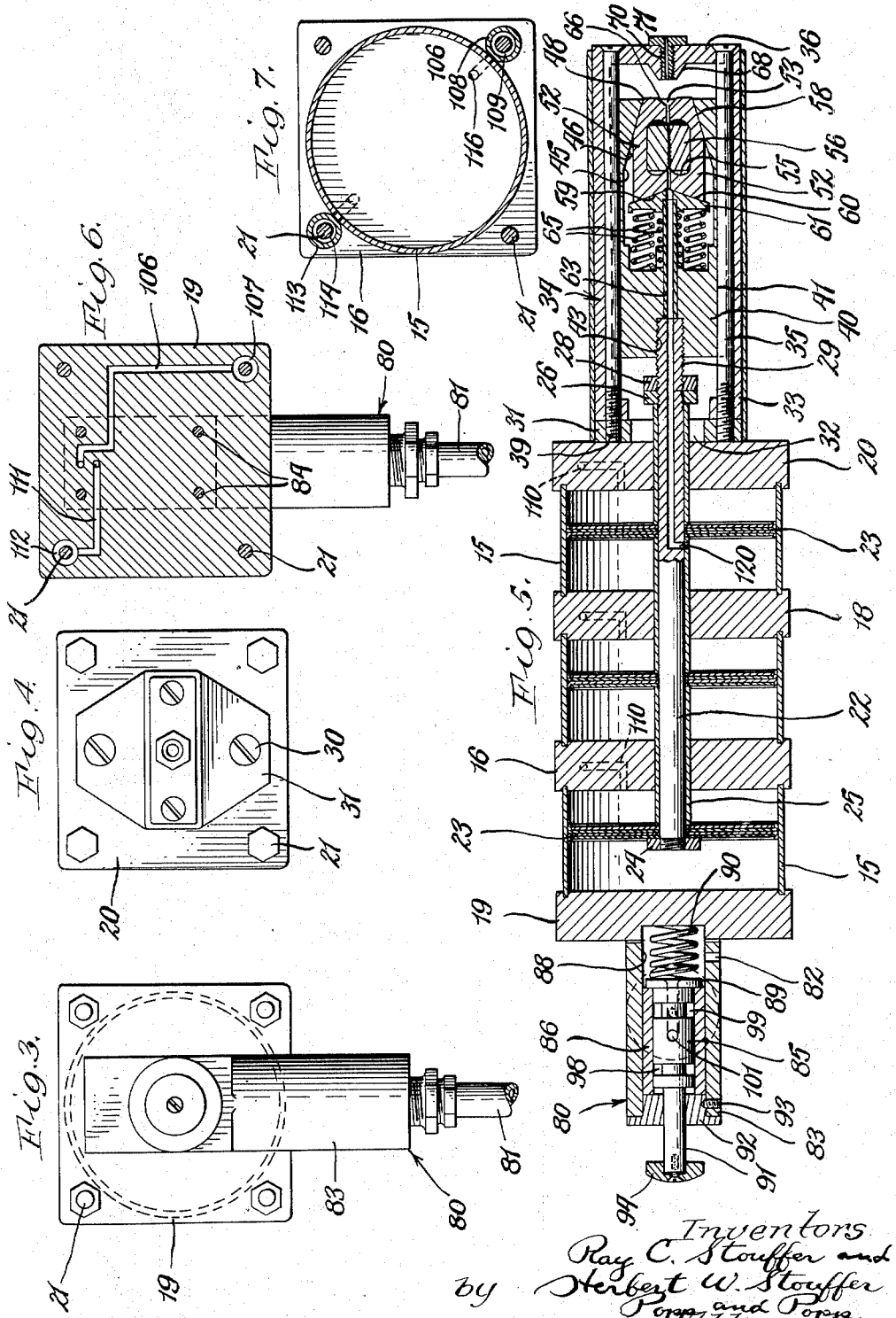

2,525,626

UNITED STATES PATENT OFFICE 2,525,626

RIVET-STEM GRIPPING AND PULLING MECHANISM

Ray C. Stouffer, Buffalo, N. Y., and Herbert W. Stouffer, Fort Erie, Ontario, Canada Application December 29, 1945, Serial No. 638,094

2 Claims. (218—19)

This invention relates to a tool for use in setting or fixing pierced or tubular rivets, of the kind in which the rivet is mounted on a mandrel having an enlarged head so that, when the rivet is inserted in position, by thrusting upon the end of the rivet and simultaneously pulling upon the mandrel the head of the mandrel causes the rivet to expand and upset. While the stem of the mandrel can be threaded to receive a nut or otherwise adapted for securing attachments, or may be cut off or pushed back, the mandrel for which the present tool is particularly adapted has its head torn from the stem of the mandrel in expanding the rivet, the stem being drawn through the rivet by the tool and the head falling back.

One of the principal objects of the invention is to provide such a tool which operates from pneumatic pressure, and at the same time is compact and light in weight so that it is convenient to use as a manual tool.

Another object is to provide such a pneumatic tool which embodies an air cushion for the impact resulting from the tearing of the head of the mandrel from the stem thereof.

Another object is to provide such a pneumatic tool in which provision is made for utilizing the pneumatic pressure to blow the stem of the mandrel from between the jaws of the tool so that the tool is immediately placed in condition for application to another rivet.

Another object of the invention is to provide such a pneumatic tool which is relatively long and slender so as to be capable of easy handling, this being accomplished in the present invention by the provision of a multiple of pistons arranged in tandem.

Another purpose is to provide such a tool having simple and readily operable valving for introducing and relieving the pneumatic pressure.

Another aim of the invention is to provide a positive release for both of the jaws which grip the mandrel and which spreads the jaws for the reception of the mandrel of another rivet.

Another aim is to provide, in such a tool, low cost and readily replaced gripping faces for the jaws which seize the mandrel.

Another aim of the invention is to provide a simple one-piece yoke which carries the jaws and the parts associated therewith.

In the accompanying drawings:

Fig. 1 is a top plan view, with parts broken away, of a riveting tool embodying the present invention.

Fig. 2 is a side elevation thereof, with parts broken away.

Fig. 3 is an end elevation thereof.

Fig. 4 is an opposite end elevation thereof.

Fig. 5 is a horizontal longitudinal section through the tool, this section being taken on line 5—5, Fig. 2.

Figs. 6 and 7 are vertical transverse sections, taken on the correspondingly numbered lines of Fig. 2.

Fig. 8 is a fragmentary vertical longitudinal section, taken on line 8—8, Fig. 1.

Fig. 9 is a view similar to Fig. 8 showing another position of the valve.

Fig. 10 is a fragmentary enlarged view similar to Fig. 5 and showing the parts in position about to seize the mandrel for expanding the tubular rivet.

Fig. 11 is a view similar to Fig. 10 showing the mandrel seized by the jaws of the tool and drawn to upset or expand the tubular rivet.

Fig. 12 is a fragmentary view similar to Figs. 10 and 11 and showing the broken off stem of the mandrel being ejected from between the jaws of the tool by air pressure.

Fig. 13 is a vertical transverse section, taken on line 13—13, Fig. 11.

The tool includes three cylinders 15 arranged coaxially and separated by intermediate cylinder heads 16 and 18 and having outer end heads 19 and 20. These cylinders and end heads can be secured together in any suitable manner as by the four tie bolts 21 shown which extend through all of the cylinder heads and hold the multiple cylinder structure in assembled relation.

These cylinder heads 16, 18 and 20 are provided with coaxial central bores in which a piston rod 22 is arranged. Within each of the cylinders 15 a piston 23 of any suitable character is mounted on the piston rod 22. These pistons can be secured to the piston rod in any suitable manner and are shown as secured by an end nut 24 on the piston rod and a series of sleeves 25 each slidingly mounted in the central bore of the corresponding cylinder head 15, 18 and 20, these sleeves serving to space the pistons 23 and the sleeve 25 within the cylinder head 20 being held by a nut 26 and lock nut 28 provided on the external threaded end 29 of the piston rod 22. It will be seen that through the sleeves 25 the pistons 23 are secured at spaced intervals by the end nuts 24 and 26.

Secured by screws 30 to the outer face of the end head 20 is a plate 31 which is shown as being octagonal in shape and which has a central opening 32 surrounding the projecting end of the piston rod 22. To this plate are secured the legs 33 of a yoke 34 this yoke extending horizontally outward from the multiple cylinder structure coaxially therewith. This yoke is secured to the anchoring plate 31 by a pair of screws 35 which extend through the end cross bar 36 of the yoke 34 and along the inner sides of the legs 33 thereof. The threaded ends of these screws 35 screw into threaded openings 38 provided in the anchoring plate 31.

Within the yoke 34 is slidingly mounted a slide 40 having opposite semi-cylindrical slideways 41 which engage the screws 35. To facilitate construction the yoke 34 and slide 40 are preferably made from a single block of metal, this block being drilled to provide the holes for the screws 35 and this block then being sawed along these drilled holes and transversely at the cross bar 36 of the yoke so as to separate the slide 40 from the yoke 35 and at the same time insure a proper fit between the screws 35 and both the yoke 34 and the slide 40. This slide is provided with an internally threaded bore 43 at one end in which the threaded end 29 of the piston rod is screwed.

This slide is provided with a chamber 45 which is relatively wide at its rear end and at its front end is provided with converging wedging faces 46 leading to an opening 48 at the extremity of the slide opposite from the cylinder structure. For accessibility to the parts within this chamber the rear end of the chamber 45 is open at its upper and lower sides and provided with cover plates 49 fitted therein. These cover plates are held by a tubular sheet metal sleeve 50 which is rectangular in cross section and which is fitted over the yoke 34 from the outer end thereof. Within the chamber 45 is arranged a pair of jaws 52, these jaws being in the form of blocks of metal, the upper and lower faces of which fit the upper and lower walls of the chamber 45, these upper and lower walls of the chamber 45 being in part provided by the cover plates 49 and in part provided by the cross pieces 53 which provide the opening 48 at the end of the slide. These jaws 52 are provided with opposed recesses 55 which are generally rectangular in shape and each of which receives an oblong mandrel gripping member 56. The purpose of these oblong gripping members 56 is to provide readily removable gripping surfaces to engage the mandrel, and sections of a square file have been found to be of low cost and entirely satisfactory for this purpose.

Each of the jaws 52 is provided with a wedge face 58 which conforms to and engages the corresponding wedge face 46 of the slide 40. At its opposite end each of these jaws 52 is provided with wedge faces 59 which face convergingly toward each other and are engaged by the conforming faces 60 of a wedge-shaped follower 61. This follower is provided with a central bore 62 in which is fitted a tube 63 mounted in the slide 40 coaxial with the multiple cylinder structure. The follower 61 is urged into engagement with the jaws 52 by a plurality of helical compression springs 65 one of which surrounds the tube 63 and the other two of which are arranged on opposite sides thereof. At their outer ends the jaws 52 are provided with opposed wedge-shaped faces 66 which diverge outwardly toward the ends of the jaws. These wedge-shaped faces 66 cooperate with wedge-shaped faces 68 provided in the enlarged central part of the end cross bar 36 of the yoke 34. This enlarged central part of the end cross bar 36 also carries a bushing 70, this bushing being screwed therein and forming a tubular thrust member having a head 71 at its forward end which engages the tubular rivet as hereinafter described. This bushing or tubular thrust member has a bore which receives the mandrel and can be replaced with a bushing having a different sized bore to receive a different sized mandrel.

This tubular thrust member 70 is fitted against the flange 72 at one end of the tubular rivet 73, the other end of this tubular rivet being left unflanged so that it can be inserted into registering openings provided in the pieces 74 to be riveted together. The flanging of the opposite end of the tubular rivet 73 is effected by a mandrel 76 having a stem 78 which is gripped by the mandrel gripping members 56 and is provided with a head 79 which is torn from the stem of the mandrel in expanding the tubular rivets 73, as indicated by dotted lines in Fig. 11.

The slide 40 is reciprocated along the screws 35 pneumatically. For this purpose a sliding cylindrical control valve indicated generally at 80 is secured to the rear end of the multiple cylinder structure and is connected to an air pressure line 81 and provided with a vent 82. This valve comprises a valve body 83 which is shown as secured to the outer face of the end head 19 by screws 84 (Fig. 9) and as having a sliding valve cylinder 85 slidingly fitted in a sleeve 86 arranged in a bore 88 in the valve body 83, this bore being shown as coaxial with the multiple cylinder structure. The inner end of the sliding valve cylinder 85 is shown as flanged outwardly, as indicated at 89, to fit the end of the sleeve 86 and a helical compression spring 90 is arranged in the bore 88 and interposed between the cylinder head 19 and the flanged end 89 of the sliding valve cylinder 85 so as to urge this valve head 85 outwardly. The opposite end of the sliding valve cylinder 85 is provided with a push stem 91 slidingly fitted in a bonnet 92, this bonnet being fitted in the outer end of the bore 89 and secured in place by a set screw 93 or in any other suitable manner. The push stem 91 for the valve is provided with a head 94 and the stem 91 and sliding cylindrical valve 85 can be held against turning by a pin 95 secured to one side of the head 94 and sliding in a bore 96 provided axially in the bonnet 92.

The sliding valve cylinder 85 is provided in its periphery with an outer annular groove 98 and an inner annular groove 99. This valve stem is additionally provided with a passage 100 leading from a port 101 in the upper side of its periphery to the inner end of the bore 88 in the valve body, this inner end of the bore 88 being vented through the vent opening 82, as shown in Fig. 2. The air pressure supply pipe 81 leads to a chamber 103 in the bottom of the valve body 81 and the sleeve 86 is provided with a pair of ports 104 and 105, the port 104 establishing communication between the air pressure supply chamber 103 and the annular groove 98 of the sliding valve cylinder when this sliding valve cylinder is positioned inwardly, as illustrated in Fig. 8, and the port 105 establishing communication between the air pressure supply chamber 103 and the annular groove 99 of the sliding valve cylinder when the valve is released, as shown in Fig. 9.

In the depressed position of the valve, illustrated in Fig. 8, the annular groove 98 in the sliding valve cylinder 85, in addition to being in communication with the air pressure supply chamber 103 through the port 104 is also in communication with a passage 106 which extends through the valve body and into the end head 19 and communicates with a bore 107 surrounding the lower right hand (Fig. 6) tie bolt 21. Between the cylinder heads 19, 16, 18 and 20 this tie bolt is surrounded by sleeves 108 which have airtight fit with these cylinder heads 19, 16, 18 and 20 and which provide an air passage 109 extending the full length of the multiple cylinder structure. This air line is connected by a branch passage 110 in each of the cylinder heads 16, 18 and 20 with the corresponding cylinder, these passages communicating with the forward ends of the several cylinders so that when air pressure is introduced therethrough the pistons 23 are moved rearwardly.

In the released position of the valve, illustrated in Fig. 9, the annular groove 99 in the sliding valve cylinder 85, in addition to being in communication with the air pressure supply chamber 103 through the port 105 is also in communication with a passage 111 which extends through the valve body and into the end head 19 and communicates with a bore 112 surrounding upper left hand (Fig. 6) tie bolt 21. Between the cylinder heads 19, 16, 18 and 20 this tie bolt is surrounded by sleeves 113 which have airtight fit with these cylinder heads 19, 16, 18 and 20 and which provide an air passage 114 extending the full length of the multiple cylinder structure. This air line 114 is connected by a branch passage 115 in each of the cylinder heads 16 and 18 with the corresponding cylinder, these passages communicating with the rearward ends of these cylinders. In addition a restricted passage 116, provided in a screw bushing 117, as shown in Figs. 8 and 9, establishes direct communication between the passage 111 and the adjacent cylinder. It will therefore be seen that when air pressure is introduced into the passage 111 this pressure is impressed through the passage 116 and through the passage 114 and branches 115 on the rear sides of the pistons 23 so as to drive them forwardly. The restricted size of the passage 116 cushions the reaction of the tool when the mandrel head breaks, as hereinafter described.

In either position of the sliding valve cylinder 85, when one of the passages 106 or 111 is so in communication with the air pressure supply chamber 103, the other of these passages is in communication with the passage 100 leading to the vented inner end of the bore 88.

A feature of the invention also resides in the provision of means for blowing the severed stem 78 of the mandrel 76 from the tool after the riveting has been completed. To this end the piston rod 22 is provided with a passage 120 communicating at one end with the interior of the tube 63 and at its opposite end with the interior of one of the cylinders 15 on the rear side of the corresponding piston 23, as best shown in Fig. 5. In addition the follower 61 is provided with a passage 121 in line with the stem 78 of the mandrel held between the jaws 52 and communicating with the interior of the tube 63.

In the operation of the tool the mandrel 76 is first inserted in the tubular rivet 73 with its head 79 in engagement with the unflanged end of this tubular rivet. The unflanged end of this rivet 73 is then inserted in the registering openings of the pieces 74 to be riveted together. The tool operates to thrust against the flange 72 of the tubular rivet 73 and at the same time to pull upon the stem 78 thereof. This action forces the head 79 of the mandrel against the unflanged end of the tubular rivet 73, thereby to expand or upset a flange upon the unflanged end thereof.

The tool also operates to exert sufficient pressure upon the mandrel 76 to tear the head 79 from its stem 78, this head falling, as indicated by dotted lines in Fig. 11, the stem being retained by the tool.

To accomplish this result, after the assembled tubular rivet 73 and its mandrel 76 have been inserted in the pieces 74 to be rivetted together, the tool is brought with its tubular thrust member 70 against the flange 72 of the rivet, the stem 78 of the mandrel being received in this tubular thrust member 70 and being disposed between the mandrel gripping members 56 carried by the jaws 52.

With the tool in this position the valve head 94 is pressed inwardly against the resistance of the helical spring 90 to the position shown in Fig. 8. In this position air pressure from the supply line 81 passes through the chamber 103, port 104 in the sleeve 86, annular groove 98 in the sliding valve cylinder 85, passage 106 in the valve body 83 and cylinder head 19, passage 109 through the several sleeves 108 surrounding the lower right hand (Fig. 6) tie rods 21 and branch passage 110 in each of the cylinder heads 16, 18 and 20. These branch passages 110 impress this pressure on the forward side of each of the pistons 23 thereby to move these pistons and their piston rod 22 rearwardly. This piston rod 22 is connected with the slide 40 and this movement of the piston rod moves this slide along the screws 35 from the position shown in Fig. 10 to the position shown in Fig. 11.

The rearward movement of the slide 40 operates to effect the movement of the jaws 52 toward each other as well as the rearward movement thereof. Thus, the springs 65 acting against the follower 61 urge the jaws 52 into engagement with the opposing cam faces 46 of the slide 40 and also into engagement with the cam faces 68 of the end cross bar 36 of the yoke 34. Hence when the slide 42 is so moved rearwardly by air pressure impressed on the several pistons 23 the springs 65 move the jaws 52 along the cam faces 46 of the slide, these cam faces thereby bringing the jaws 52 toward each other and into engagement with the stem 78 of the mandrel 76, this engagement being between this mandrel and the mandrel gripping members 56 mounted in these jaws. When this engagement with the stem of the mandrel 76 is effected no further inward movement of the jaws 52 is possible and hence the continued rearward movement of the slide 40 causes the jaws 52 to move rearwardly with the slide. Since these jaws are in gripping engagement with the stem of the mandrel 76 a rearward pulling force is applied to the mandrel. Since the tubular rivet 73 is held against the tubular thrust member 70, this rearward pulling movement of the mandrel draws the head 79 of the mandrel against the unflanged end of the tubular rivet 73 thereby to expand a flange or head on this unflanged end of this rivet. The continued rearward movement of the mandrel 76 causes the head 79 to be ruptured from the stem 78 of the mandrel, this head falling free, as indicated by dotted lines in Fig. 11.

This results, of course, in a sudden release of the slide 40 and its jaws gripping the stem of the severed mandrel and a feature of the invention resides in the fact that this movement of the slide, immediately following the severance of the head 79 of the mandrel and release of its stem 78, is cushioned. Thus, while the forward sides of the pistons 23 are under air pressure, as just